Aug. 5, 1958
C. A. HUBERT
2,845,990
ROTATABLE TRACTOR SEAT
Filed Sept. 10, 1956
3 Sheets-Sheet 1
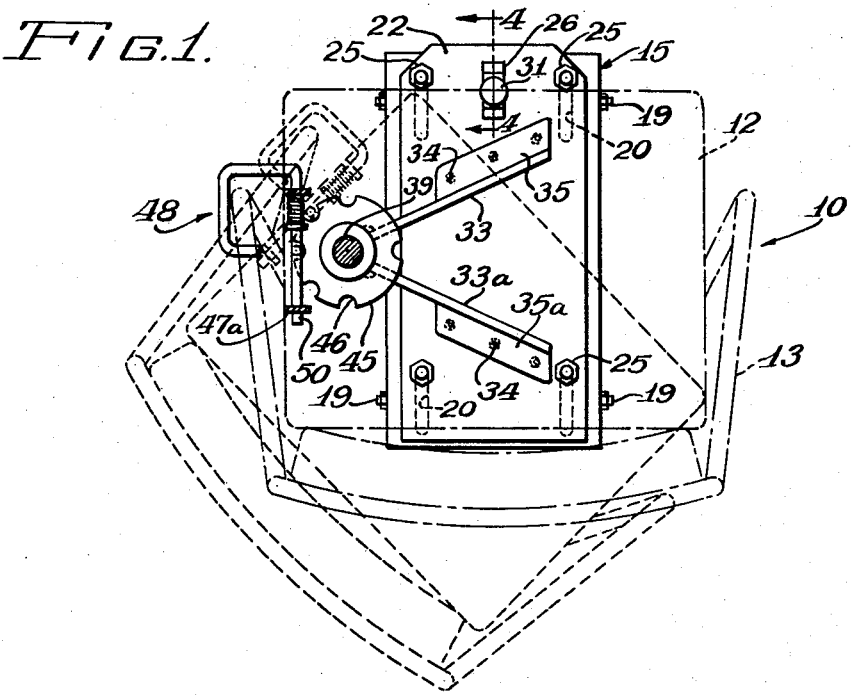
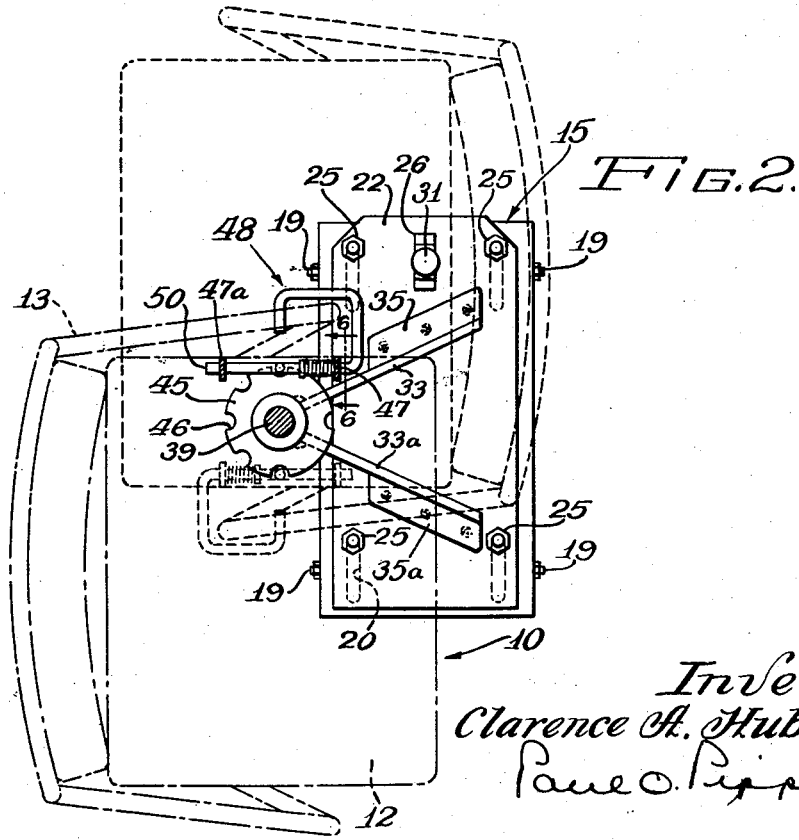
Inventor:
Clarence A. Hubert
Paul O. Pippel
Atty.

Aug. 5, 1958 — C. A. HUBERT — 2,845,990
ROTATABLE TRACTOR SEAT
Filed Sept. 10, 1956 — 3 Sheets-Sheet 2

Inventor:
Clarence A. Hubert

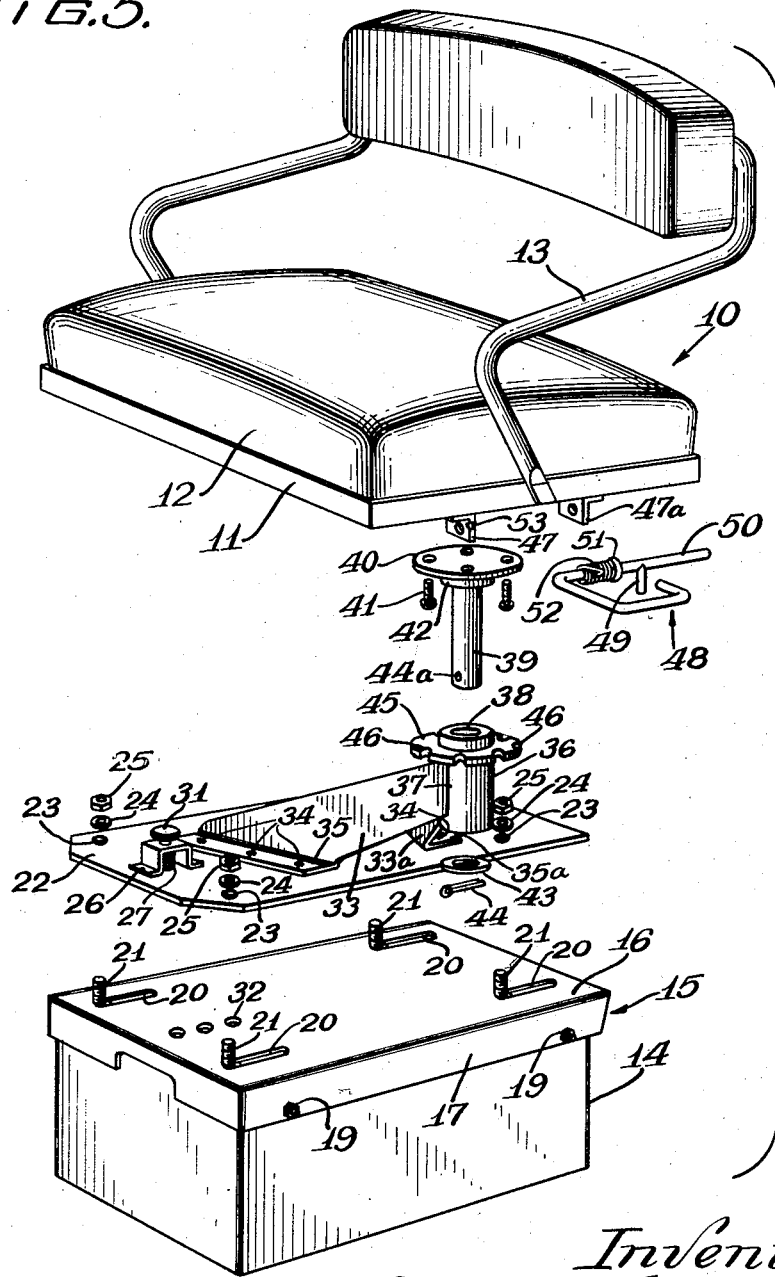

United States Patent Office 2,845,990
Patented Aug. 5, 1958

2,845,990

ROTATABLE TRACTOR SEAT

Clarence A. Hubert, Chicago, Ill., assignor to International Harvester Company, a corporation of New Jersey Application September 10, 1956, Serial No. 608,832

5 Claims. (Cl. 155—14)

This invention relates generally to tractor seats, but more specifically it is directed to a mounting structure for pivotally and slidably mounting such seats.

A general object of the invention is to provide a vehicle operator's seat that may be mounted for pivoting and fore-and-aft sliding in a generally horizontal plane.

Another object is to provide means for pivotally mounting a tractor seat so as to permit pivoting the seat in a horizontal plane to a plurality of indexed positions and thereby eliminate the necessity for the driver having to sit in an awkward, uncomfortable and fatiguing, twisted position in order to watch a plow or any other implement that is being pulled by the tractor.

A further specific object is to provide means for pivotally mounting a tractor seat wherein the pivotal axis therefor is offset from both the center line of the seat and of the mounting support so as to permit the seat to be rotated out of the driver's way and thereby provide better access to an egress from a driver's platform.

A still further object is to provide independent means for pivotally and slidably mounting a tractor seat, which separate means include mechanisms for locking said seat in any one of a plurality of different rotated and fore-and-aft positions.

The foregoing and other objects and features of the invention will become apparent as the disclosure is more fully made in the following detailed description of a preferred embodiment thereof, as illustrated in the accompanying sheets of drawings in which:

Figure 1 is a top plan view of a tractor seat mounted in accordance with the proposals of the present invention, the seat being shown in a normal driving position by a dot-dash outline and in a partially rotated position by a broken line;

Figure 2 is a plan view similar to Figure 1 but with the seat shown in 90° clockwise and counter-clockwise rotated positions;

Figure 5 is an exploded perspective of the proposed seat and mounting structure.

Figure 3:
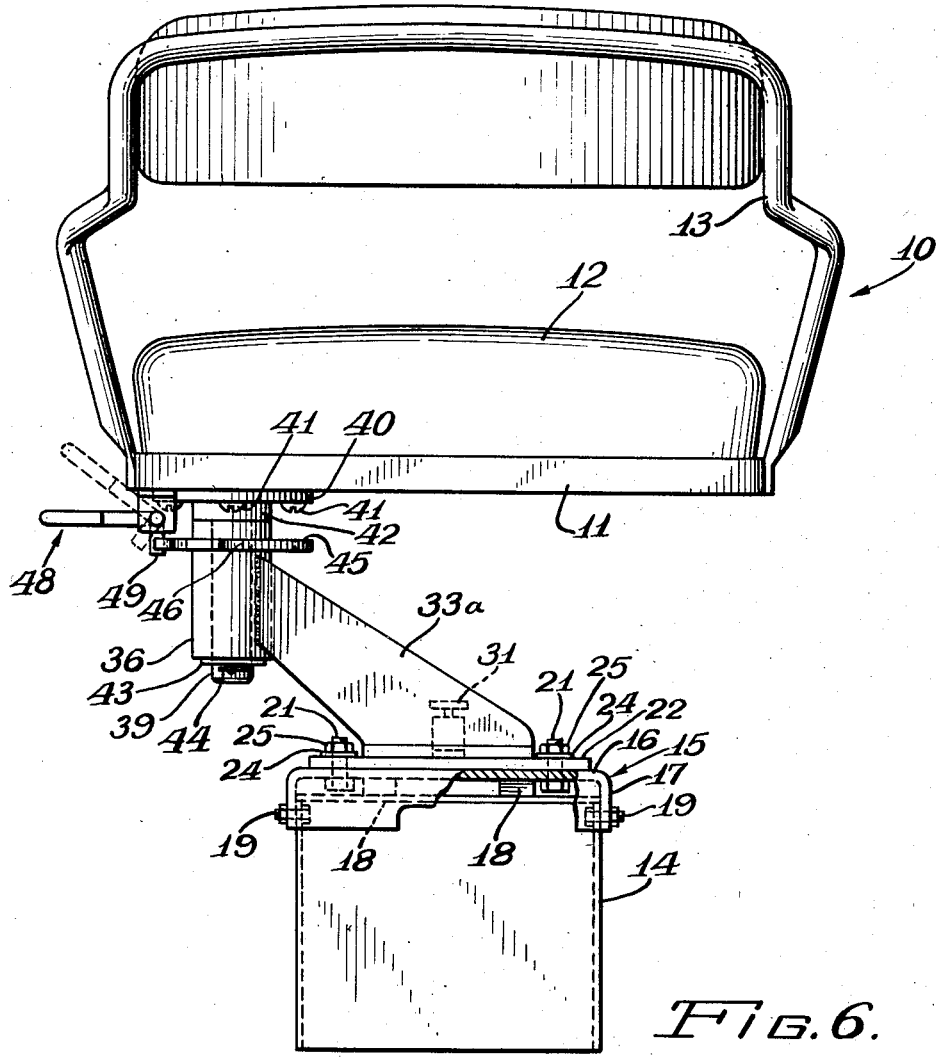
Figure 3 is a rear elevational view of the proposed seat and mounting structure.

It will be noted, by referring to the drawings, that in the embodiment selected for illustrating a preferred application of the proposed seat mounting structure, a generally conventional cushion-type seat, with a backrest, has been provided. The seat depicted, and shown generally by the reference numeral 10, includes a rigid base or floor member 11 upon which is fixedly positioned a cushion member 12 and a backrest support assembly 13.

The battery box 14, which is generally conventional in modern tractors, provides a convenient and highly satisfactory support upon which the seat structure may readily be mounted without having to effect any structural changes in the tractor's body or its frame. It must be appreciated, however, that such means of mounting is only illustrated as being a simple, convenient and readily available expedient; hence the proposed invention should not be limited or restricted to the specific mounting support shown, but may be mounted elsewhere, as desired, without deviating from the teachings hereof.

Positioned over the battery box 14 is a canopy-like supporting cover plate, indicated generally by the reference numeral 15, which is fashioned as a platform 16 from which depends a peripherally extending wall-like flange 17. Spacer blocks, such as shown at 18, may, if desired, be provided to space the platform 16 a slight distance from the top of the battery box 14 for purposes which will presently be more readily apparent. Suitable securing means, such as the bolt and nut means represented at 19, may be utilized to fixedly mount the canopy 15 on the battery box 14 and thus provide a rigid but removable attaching arrangement for the proposed seat structure.

Figure 4:
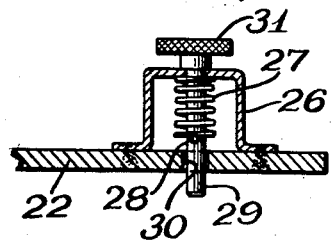
Figure 4 is a partial vertical sectional view taken on line 4—4 of Figure 1 and shows the detailed construction of the fore-and-aft position locator device.

The foundation canopy 15 is fashioned with a plurality of longitudinally extending slotted openings 20 which are dimensioned to slidably receive the shanks of the cap screws 21, while the heads of said screws are positioned, preferably, in the space provided between the platform 16 and the top of the battery box 14. Adapted for slidable positioning on the platform 16 is a base-plate member 22 which is fashioned with a plurality of openings 23 therein that are disposed so as to be in registering alignment, when said plate overlies the platform 16, with the respective slotted openings 20 in said platform, and, additionally, are dimensioned to easily receive the shanks of the bolts 21. Lock washers, such as shown at 24, and nuts 25, may be used on the bolts 21 to fasten the base-plate 22 to the platform 16 in a secure but slidably movable relationship. A U-shaped bracket member 26 is fixedly mounted on the plate 22, while a coil spring 27 is compressed between the top or cross arm of said bracket and a pin 28 (Figure 4) that is transversely positioned in a plunger-like rod 29, which rod, in turn is slidably mounted in said bracket and through an opening 30 in the plate 22. The upper outwardly extending end of the rod 29 is provided with a button-like knob 31, while the oppositely extending end of said plunger rod is adapted for insertion in any one of a series of longitudinally spaced openings 32, disposed in registering alignment therewith, in the platform 16. Lifting of the button 31 releases the rod 29 from one of the openings 32 and thus permits the base-plate 22 to be slidably moved fore-and-aft over the platform member 16. The spring 27, being normally compressed, functions, when released, to force the plunger rod 29 into one of said aligned platform openings and thereafter retains said rod so positioned until manually released, thus firmly securing the seat structure against any accidental fore-and-aft movement relative to said platform.

A pair of angularly-shaped offsetting bracket members 33—33a are secured, by suitable means such as the welds indicated at 34, 34 along the respective flanged edge portions 35—35a thereof to the base-plate 22. The upwardly extending web portions of said brackets also project transversely in offset fashion toward one side of said base-plate and terminate in a vertically extending journaling boss 36 to which said brackets are rigidly affixed, by suitable means such as the welds indicated at 37. An opening 38 through the center of said boss is dimensioned to rotatably receive a shaft or pintle-like pin 39 which has a flange-like mounting plate 40 fixedly secured to one end thereof. Said mounting plate, in turn, is adapted for attachment to the base 11 of the seat 10 and suitable conventional means, such as the threaded screws 41, may be utilized for this purpose. When the pintle 39 is inserted in the opening 38 of said boss a bearing collar 42 on said pintle slidably contacts the upper edge of the journaling boss 36 which thereafter functions as a thrust bearing to receive and distribute the weight of the seat 10 and its occupant. After the shaft 39 is insertably positioned in the boss 36 a washer, such as 43, is slipped over the projecting end of the shaft and said washer thereafter is retained in place by well known means, such as the cotter pin 44 which is inserted into a transversely disposed opening 44a in the projecting end of said shaft. As thus arranged the seat is pivotally suppored in cantilever fashion above and to one side of the base-plate and platform members, with the vertical axis of said pivot, when extended, falling outside the boundaries of said plate and platform members.

An indexing plate 45 around the journaling boss 36 is fixedly secured thereto by any suitable well known or conventional affixing means, or, if desired, such plate may be fashioned integral with said boss. Said indexing plate is fashioned with a plurality of marginal edge notches or slotted recesses 46, which are located at the predetermined circumferentially spaced intervals required to provide, the degree of rotation desired for each position of the seat. A pair of spaced apart brackets 47—47a are fixedly mounted, by any well known means, to the underneath surface of the base 11, of the seat 10, and are disposed so as to depend therefrom. Rotatably supported within these depending brackets is a handle-like release or actuating device, indicated generally by the reference numeral 48, which is operable to rotate a detent or indexing pin, such as 49, into and out of interlocking engagement with the individual recesses 46 in the indexing plate 45. Said actuating handle may be fashioned from a rod-like member 50 which has been formed to provide two parallel side arms connected together by a cross arm, and with one of said side arms longer than the other and inwardly turned at the free end thereof, so that the configuration of the formed member generally resembles the shape of the letter J. The detent or indexing pin 49 is fixedly secured to and depends from the longer of said two side arms.

Figure 6:
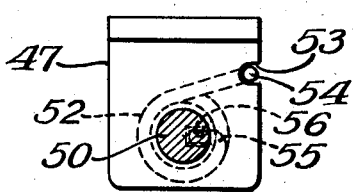
Figure 6 is a partial vertical sectional view taken on line 6—6 of Figure 2.

A collar-like flange 51 fixedly positioned on the rod 50 may provide a positioning abutment for one end convolution of a coil spring 52 which is wound around said rod, while the opposite end convolution of said spring is posititioned so that it may abut against one of said depending brackets. Since any suitable arrangement may be used to cause the spring 52 to bias the pin 49 into a normally engaging or interlocking position within one of the slots or recesses 46, the invention should not be limited to the specific means shown, for illustrative purposes, herein. The well known spring anchoring and biasing arrangement depicted in the attached drawings contemplates the provision of a notched opening 53, disposed along one edge of the bracket 47, into which a turned or bent-over end portion 54 of the spring 52 is insertably anchored. The intermediate convolutions of said spring are wrapped around the long side arm of rod 50, while the opposite end of the spring has a bent-over portion 55 that is inserted in anchoring fashion in a radially extending recess 56 in said rod. As thus disposed the torsional reaction of the spring 52 operates to bias the rod 50 to a downward or clockwise rotated position (as viewed in Figures 5 and 6), and, incident thereto, also serves to bias the detent pin 49 into a normally interlocking and engaging position with one of the slotted recesses 46. An upward twist of the handle 48 releases the pin 49 and, of course, increases the torsional reaction of the spring 52; hence when the handle is subsequently released the pin 49 rapidly returns to its interlocking relation within one of the slots 46. To turn or rotate the seat to any desired position the operator has only to turn the handle 48 and lift the pin 49 free of its associated notch 46, rotate the seat and then release said handle, after which the pin 49, because of the biasing action of spring 52, will return to an interlocking position within the particular notch 46 that is closest for the newly rotated position of the seat.

From the foregoing it will readily be appreciated that the present invention provides a simple and effective mounting means that will permit horizontal pivoting of a tractor seat to any one of a series of indexed positions, thereby eliminating the necessity for having the operator sit in an uncomfortable, twisted position in order to watch the implement being operated by the tractor. It will be appreciated, also, that the proposed seat mounting structure provides an arrangement which permits better access to and egress from the driver's platform of a tractor. The structure as proposed is novel and inexpensive to fabricate, and, furthermore, it may be readily incorporated in conventional tractors with substantially no structural modification or alteration thereof. Since it is also fashioned for fore-and-aft sliding, it is readily adaptable to operators having different physical characteristics.

Although only a preferred form of the invention has been illustrated, and that form described in detail, it will be apparent to those skilled in the art that various modifications may be made therein without departing from the spirit of the invention or from the scope of the appended claims.

What is claimed is:

1. A vehicle seat construction, comprising: a longitudinally extending platform member adapted for affixment to a vehicle; a base-plate member positioned over said platform member; means adjustably attaching said base-plate to said platform and operative to permit relative fore-and-aft movement between said base-plate and said platform; releasable pin means interlocking said base-plate to said platform in any one of a plurality of fore-and-aft displaced positions of said base-plate relative to said platform; a seat; mounting means pivotally mounting said seat above said base-plate to permit rotation of said seat about a vertical axis; said pivotal mounting means being disposed so that the vertical axis about which said seat rotates falls within the perimeter of said seat and additionally is transversely displaced a substantial distance from a vertically and longitudinally extending plane that passes through the fore-and-aft axis of symmetry of said seat; and releasable means operative to interlock said seat with said mounting means in any one of a plurality of relative rotated positions therebetween.

2. The structure of claim 1 further characterized by having the pivotal mounting means thereof disposed so that the vertical axis about which said seat rotates in addition to falling within the perimeter of the seat is transversely displaced a substantial distance from a vertically and longitudinally extending plane that passes through the fore-and-aft axes of symmetry of said seat and of said base-plate.

3. A vehicle seat construction, comprising: a longitudinally extending platform member adapted for removable affixment to a vehicle; a base-plate member positioned on top of said platform member; means, including a plurality of longitudinally and transversely spaced slotted longitudinally extending openings formed in one of said two members that receive fastening elements carried by the other of said two members, for slidably attaching said base-plate to said platform and operative to permit limited fore-and-aft movement of said base-plate relative to said platform; releasable pin means mounted on said base-plate and operative for interlocking said base-plate to said platform in any one of a plurality of fore-and-aft displaced positions of said base-plate relative to said platform; a seat having a base rigidly affixed thereto and disposed above said base-plate; pivotal means affixed to the base of said seat to permit pivoting of the seat in a horizontal plane; bracket means rigidly affixed at one end thereof to said base-plate and arranged to pivotally receive said pivotal means at the other end thereof; said bracket means being offset so as to position the vertical axis of said pivotal means within the perimeter of the seat and additionally in a plane that is transversely displaced from a vertically and longitudinally extending plane that passes through the horizontal fore-and-aft axis of symmetry of said seat; and releasable detent means manually operative to interlock said seat with said bracket means in any one of a plurality of rotated positions of said seat relative to said bracket means.

4. A vehicle seat construction, comprising: a longitudinally extending and horizontally disposed platform member adapted for removable affixment to a vehicle; a base-plate member positioned on top of said platform member; a plurality of fastening elements carried by one of said two preceding members, and a plurality of longitudinally and transversely extending openings formed in the other of said two members and arranged for receiving one fastener in each of said openings for slidably attaching said two members together and operative to permit controlled fore-and-aft movement of one of said members relative to the other; releasable pin means mounted on said base-plate and operative for interlocking said base-plate to said platform in any one of a plurality of longitudinally displaced positions and for restricting relative fore-and-aft movement between said base-plate and said platform; a cushioned seat having a rigid base thereon and disposed above said base-plate; pivotal means affixed to the base of said seat; bracket means fixedly secured at one end thereof to said base-plate, and having a vertically disposed journalling member mounted at the other end thereof pivotally receiving said pivotal means so as to permit rotation of said seat about a vertical axis; said bracket means being formed so as to position the vertical axis of said pivotal means in a plane that falls within the boundaries of said seat and additionally is parallel to and transversely displaced from a vertically extending plane that passes through the horizontal fore-and-aft axes of symmetry of said seat and of said base-plate member; manually operable detent means mounted on said seat base; said journalling member having a radially extending flange thereon fashioned with a plurality of circumferentially spaced notches that cooperatively receive said detent means to interlock said seat in any one of a plurality of rotated positions of said seat relative to said base-plate member.

5. A vehicle seat construction, comprising: a longitudinally extending and horizontally disposed platform member adapted for removable affixment to the battery box of a vehicle; a base-plate member positioned on top of said platform member; adjustable means including a plurality of transversely and longitudinally spaced fastening elements connecting said base-plate to said platform member and operative to permit controlled fore-and-aft movement of said base-plate relative to said platform; releasable pin means mounted on said base-plate and operative for interlocking said base-plate to said platform in any one of a plurality of longitudinally displaced positions and for restricting fore-and-aft movement of said base-plate relative to said platform; a seat having a rigid base and disposed above said base-plate; pivotal means affixed to the base of said seat to permit rotation of said seat about a vertical axis; bracket means rigidly connected at one end thereof to said base-plate, and having the other end thereof pivotally supporting said pivotal means; said bracket means being formed to extend angularly from said base-plate so that the vertical axis of said pivotal means lies in a plane which, when extended, falls within the boundaries of said seat and outside the boundaries of said base-plate and platform members, and additionally is parallel to and transversely displaced from a vertically and longitudinally extending plane that passes through the horizontal fore-and-aft axis of symmetry of said seat; and releasable detent means operative to interlock said seat with said bracket means in any one of a plurality of rotated positions of said seat relative to said bracket means.

References Cited in the file of this patent

UNITED STATES PATENTS

| | | |
|---|---|---|
| 1,146,849 | Cornwell | July 20, 1915 |
| 1,932,241 | Brown | Oct. 24, 1933 |
| 1,953,764 | Menton | Apr. 3, 1934 |
| 2,604,925 | Swift | July 29, 1952 |
| 2,605,819 | Le Tourneau | Aug. 5, 1952 |
| 2,628,657 | Orrick | Feb. 17, 1953 |
| 2,664,941 | Gillespie | Jan. 5, 1954 |
| 2,694,439 | Murray | Nov. 16, 1954 |
| 2,700,411 | Lamb | Jan. 25, 1955 |
| 2,721,604 | Salvadore et al. | Oct. 25, 1955 |